Oct. 30, 1962     F. E. PORAMBO     3,060,837
AUTOMATIC CRULLER MACHINE
Filed July 9, 1959     2 Sheets-Sheet 1
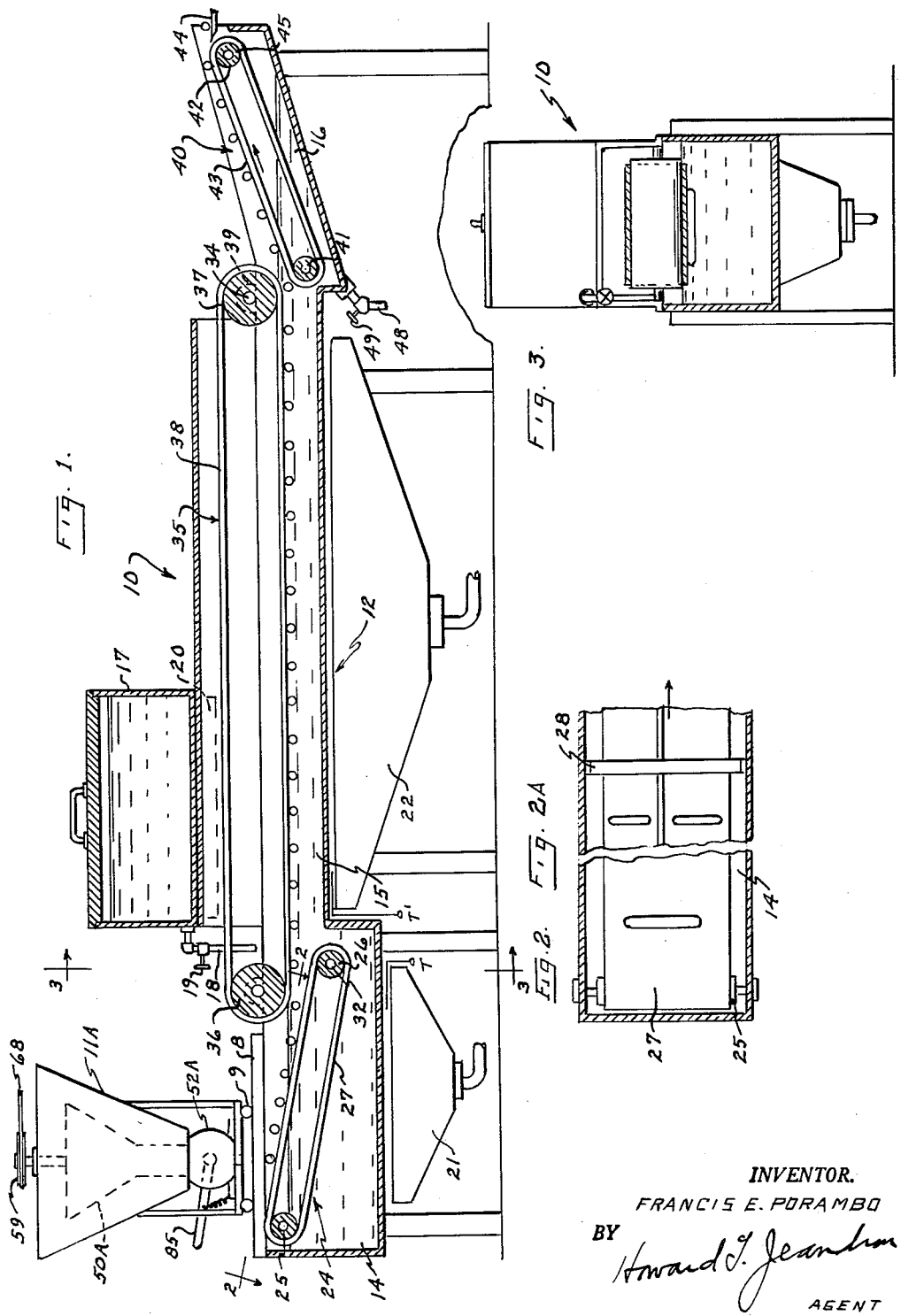
INVENTOR.
FRANCIS E. PORAMBO
BY Howard J. Jeanblan
AGENT

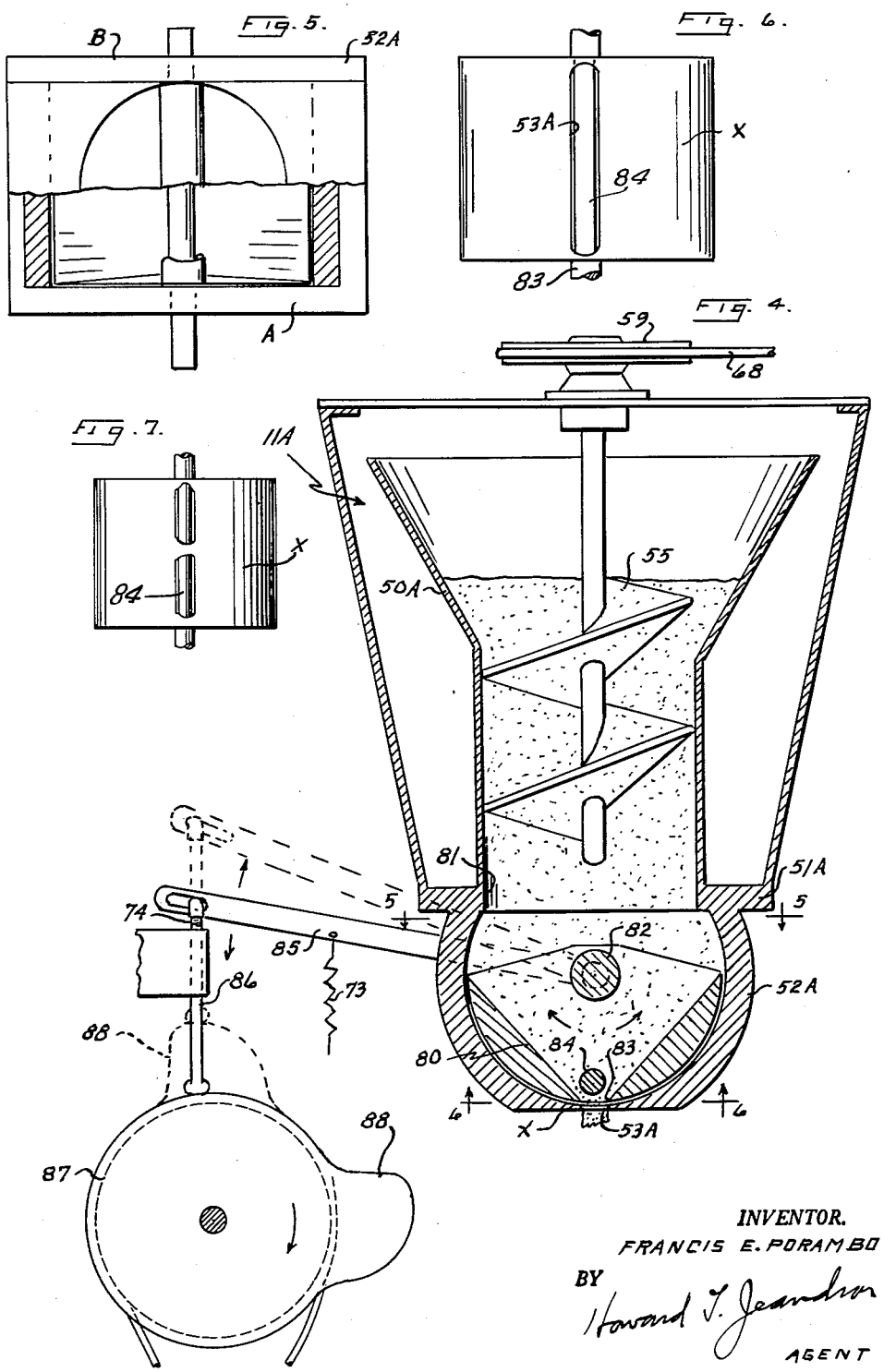

United States Patent Office 3,060,837
Patented Oct. 30, 1962

3,060,837
AUTOMATIC CRULLER MACHINE
Francis E. Porambo, South Plainfield, N.J., assignor to Franchett's Crullers, Inc., Elizabeth, N.J.
Filed July 9, 1959, Ser. No. 826,067
3 Claims. (Cl. 99—353)

This invention relates to an automatic cruller producing machine and more particularly to a series of components which transform a dough mixture into a plurality of crullers in a continuous operation in which the dough is cut into an exact quantity, the cut off dough is carried into a pre-heated shortening where the dough is transformed in a cooking operation into a cruller, and in which the cruller is advanced during the cooking operation in the shortening to complete the transformation, and in which the completely cooked cruller is carried out of the shortening and thoroughly drained and ejected from the device as a finished cruller. Although the prior art discloses automatic cruller manufacturing devices, the general arrangement, that is the components for handling the dough, are different in structure and the method of handling the dough is different, and the transformed dough is submerged to a greater degree, producing a far greater fat absorption during the cooking process, resulting in a cruller that has inferior characteristics; namely, too great a fat absorption.

An object of this invention is to provide an automatic cruller manufacturing device in which the dough mixture is automatically handled to provide a continuous formation of a predetermined amount of dough and in which the dough is automatically introduced into the pre-heated shortening and in which the partially cooked cruller is carried forward at or about the surface of the shortening to finish the cooking operation and in which the completely cooked cruller is removed from the shortening and properly drained and ejected from the device.

A further object of this invention is to provide an automatic cruller forming and cooking device in which the cruller dough is introduced into the shortening and retained in the shortening for a predetermined minimum degree of time and at or near the surface of the pre-heated shortening to provide a finished cruller with a minimum of fat absorption.

A still further object of this invention is to provide a dough handling device for an automatic cruller machine in which the dough handling device may be loaded with a prepared cruller mixed dough and in which the device may be rolled into an operating position and, further, in which the device will automatically feed the dough through a cut-off gate and, further, in which the cut-off gate is controlled to provide an exact proportion and size of dough for each cut-off operation.

Other objects of this invention shall be apparent by reference to the accompanying detailed description and the drawings in which:

FIG. 1 illustrates a side elevational view of the apparatus partly in cross-section;

FIG 2 illustrates a plan view taken on line 2–2 of FIG. 1; FIG. 2A illustrates a plan view of a further embodiment;

FIG. 3 illustrates an elevational view, partly in cross-section, taken on line 3–3 of FIG. 1;

FIG. 4 is an enlarged view partially in cross-section, showing the dough feeding mechanism and the cut-off valve;

FIG. 5 is a plan view taken on line 5–5 of FIG. 4;

FIG. 6 is a partial detail of the cut-off valve taken on line 6–6 of FIG. 4; and FIG. 7 illustrates a further embodiment similar to FIG. 6.

Referring to the drawings and particularly FIG. 1, there is illustrated a cruller manufacturing device 10.

The device 10 includes an automatic dough feeding funnel 11A mounted on wheels 9, the wheels 9 being fitted to rails 8 that form a track, thus permitting the operator to move the feeding device 11A into a feeding position or out of position for loading. A shortening tank 12 is also provided and is divided into a deep fat cooking portion 14, a shallow fat cooking portion 15, and a fat draining portion 16. A shortening tank 17 is mounted above the tank 12. Tank 17 is connected by means of a pipe 18 with a shut-off valve 19 so that the shortening may be drained from tank 17 into tank 12 and the amount of shortening may be controlled by the valve 19. In order that the shortening fluid or solid in tank 17 will flow freely, a gas heater 20 may be mounted directly under tank 17. A gas heater 21 is mounted under the deep fat portion 14 of tank 12 and a gas heater 22 is mounted under the shallow fat portion 15 of tank 12. A continuous conveyor 24 is mounted in the portion 14 of tank 12. The conveyor is mounted to rotate about a pair of drums 25 and 26. It is to be noted drum 25 is mounted near the top of portion 14 so that a portion of the conveyor will actually be out of the fluid fat and that the drum 26 is mounted well below the surface of the fat. The conveyor consists of a belt 27 which may be of metal or any suitable substance which will sustain the temperature without harmful effects on the belt itself. The belt must remain flexible and durable to withstand a continuous operation. After the dough leaves the feeding funnel 11A, it passes through a valve cut-off device and drops onto the portion of conveyor 24 that is extending out of the fluid fat or shortening. The dough is then carried into the shortening on the conveyor 24 and is picked up by the conveyor 35. In order that conveyor 24 may be rotated as desired, either of the drums 25 or 26 may be used as the driving element. In this instance, drum 26 is connected through its shaft 32 which extends through the tank 12 to a reduction gear and motor (not shown) to maintain the movement of the conveyor at a predetermined speed during its operation. A second conveyor 35 is mouned above the portion 15 of tank 12 and comprises a pair of drums 36 and 37 mounted in parallel relationship at either end of the shallow portion 15. A conveyor belt 38 is mounted to rotate about drums 36 and 37, as illustrated in FIG. 1. The conveyor is mounted so that the lower surface of the conveyor belt will move and remain just slightly below the normal operating surface of the heated shortening to thus keep the partially cooked crullers below the surface of the shortening while carrying the crullers through a frictional contact with the belt through the portion 15 of tank 12 and allowing the completely cooked crullers to bob up towards the surface of the shortening liquid at the end of their travel. The conveyor 35 is driven by either of the drums 36 or 37. In this instance drum 37 is utilized, drum 37 being mounted on a shaft 34. Shaft 34 is mounted in a bearing 39 at each edge of the tank and shaft 34 is connected to a reduction gear and motor (not shown) to provide a predetermined continuous speed of operation. A third conveyor 40 is provided in the portion 16 of tank 12. The conveyor consists of a pair of drums 41 and 42 with a conveyor belt 43 mounted to rotate about the drums. It is to be noted that drum 41 is mounted below the level of the shortening in the tank and slightly below the end of the second conveyor so that the cooked crullers will be ejected onto the surface of the conveyor belt 40. It is to be noted that drum 42 is mounted well above the level of the shortening so that the conveyor 40 will emerge from the fat or shortening carrying the crullers upward and allowing the crullers to drain while being carried upward. A platform 44 may be mounted in juxtaposition to the conveyor belt at its highest point so that the completely cooked and drained crullers will be ejected after the cooking operation.

In FIG. 4, it is to be noted that arm 85 is mounted so that the end of arm 85 will be moved from its full line position to its dotted line position when the cam element 88 (which is part of pulley 87 rotates and lifts rod 86, which in turn lifts arm 85, of course, arm 85 is retained in the dotted position while the cam portion 88 passes thereby. It is to be further noted that a spring 73 mounted at one end in a fixed position to the base of housing 52A and mounted at the opposite end to the arm 85 provides the force to return arm 85 to its original full line position after each passage of the cam 88. In order that arm 85 will return to a specific position, there is provided an adjustable element 74 which arm 85 is pivotally attached to. FIG. 4 is an enlarged detail of the dough handling and feeding device 11A. The device 11A is primarily a funnel 50A mounted on a base plate 51A. The base plate 51A is the upper portion of a circular housing 52A in which an oscillating valve 80 is mounted. Housing 52A is provided with a circular aperture 81 of a diameter to equal the diameter of the funnel 50A at its base. Valve 80 is pivotally mounted on a shaft 82, shaft 82 being pivotally supported in both sidewalls A and B of the housing 52A. The housing 52A, at its undersurface X, is provided with an aperture 53A. The valve 80 is formed generally with a V-shaped inner portion and a half-round outer periphery. An aperture 83 is formed at the bottom of the inner V shape, passing through to the half-round outer periphery of the valve 80. The half-round periphery is of a slightly smaller diameter than the internal diameter of the circular housing 52A, so that valve 80 may be pivotally moved on shaft 82. The aperture 83 is simply an elongated slot, FIG. 6, to permit the dough that is forced downward from the funnel 50A to pass through the aperture 53A in housing 52A when slot 83 is in alignment with the aperture 53A. To insure a flow of dough through and toward both edges of the aperture, a rod 84 is mounted at each end in housing 52A and is positioned slightly above the aperture 83 as shown in FIGS. 4 and 6; thus the dough will flow around rod 84 on each side forcing itself to completely fill aperture 83 as it is extruded through the aperture. It is apparent that by oscillation of the valve 80 either way, the pivotal movement may be utilized to cut off the flow of dough. This movement is utilized in this invention to permit a measured amount of dough to flow through slot 83 and aperture 53A, and having passed a predetermined amount of dough through these openings, valve 80 is then moved clockwise to cut off the flow of dough; thus a desired amount of dough is dropped by means of this valve to fall upon the conveyor 24. The timing of the movement of valve 80 may be controlled in any fashion to obtain this desired cut-off operation, as, for example, provision of a crank arm 85 attached to the shaft 82 where it extends through wall A of the housing 52A as already described; the movement of crank arm 85 upward moves valve 80 clockwise. The movement of arm 85 may be predetermined with an adjustable push rod 86, in which the push rod is mounted to ride on a cam 87. Cam 87 is provided with a raised portion 88, which for each rotation of cam 87, will raise push rod 86, causing arm 85 to move valve 80 sufficiently to cut off the flow of dough and immediately return to its open position for the next extrusion of dough, and the cycle will continually repeat itself, thus dropping predetermined quantities of dough through the valve 80 onto the conveyor 24.

The size and shape of the aperture 53A shown in FIG. 6 will control the size and shape of the doughnut extruded; further there may be two aligned apertures to deposit two portions of dough as shown in FIG. 2. Thus the general length of the doughnut will be controlled. With a screw arrangement 55 mounted in the funnel 50A, a pulley wheel 59 may be mounted at the top of the shaft supporting the screw 55. A belt 68 is provided to drive pulley 59, belt 68 passing to a pulley (not shown) and driven by a motor (not shown). Thus the screw 55, if driven at the proper speed, will produce the desired degree of movement of the dough through the aperture 81 into the valve housing and through the valve's V-shaped interior around the spreader rod 84 and through the slot 83 and in turn through the predetermined size aperture 53A.

It is apparent, referring to FIG. 1, that the motors (not shown), namely the motor that must be provided for driving the feed screw and the motors that must be provided for driving each of the three conveyors, may be (which is sometimes furnished in a solid state) controlled independently or may be connected to operate in unison. Either method will work satisfactorily as all of the motors are necessarily operated during the operation of this device. It is also to be noted, referring to FIG. 1, that the gas heaters may be operated separately with advantage; that is, the gas heater 20 may be first operated to change the shortening from a solid state to a fluid state and gas heater 20 may be reduced in its heat to the amount necessary to maintain the shortening in a fluid condition. Gas heaters 21 and 22 are necessarily started to maintain the shortening in a fluid condition. However, gas heater 21 and gas heater 22 may be controlled by separate thermostatic means, T and T', as it may be advantageous to maintain gas heater 21 at a higher degree of heat because it is mounted under the deep fat portion of the tank while gas heater 22 may be maintained at a different temperature being under the shallow fat portion of the tank. At any rate, a desired predetermined temperature should be maintained for the initial cooking operation and for the continuous cooking operation.

Although the device has been disclosed as a plurality of components connected in a particular order, it is apparent that the cruller dough mixture may be supplied from a different type of feeding device without departing from the spirit of this invention and the conveyors may be changed in their size, their length, or the particular angle of mounting without departing from the spirit of this invention, and the tank provided for retaining the shortening may be changed in its shape or its length without departing from the spirit of this invention and the manner of heating this device may be any form of heat, whether gas, electric or coal, without departing from the spirit of this invention, and the particular shortening, of course, may be varied as long as it provides the necessary fluid bath for the crullers during the cooking operation and the control of the cut off valve may be changed to provide different shape and size dough portion; that is the cycle of valve open to valve closed may be changed, so that instead of dropping a portion of dough that resembles a finger, the valve may remain open for a longer period and the portion of dough extruded will stretch out in a layer. The layer of dough will first contact the moving conveyor and be carried away from the extruding valve opening so that the remaining layer of dough will fall into a flat supported position on the conveyor. The general form of this embodiment will resemble a slice of bread or cake. Other changes may be made for the formation of cooking dough for each operation without departing from the spirit of this invention, an this invention shall be limited only by the appended claims.

What is claimed is:

1. A cruller producing machine which includes a dough feeding and cut-off device to control the quantity and shape of dough for each cruller, said dough feeding and cut-off device mounted over a cooking tank filled with shortening, said dough cut-off device comprised of a funnel shaped element with a feed screw therein and mounted on a valve housing, said feed screw providing a continuous flow of dough toward said extruding aperture without excessive pressure, said housing being open to said funnel on one side and provided with a part cylindrical form with a valve face on the other side and provided with a first extruding aperture a pivotally supported valve therein, said valve being semi-cylindrical on its outer periphery to fit within said part cylindrical housing and provided with a second extrusion aperture therethrough, said valve pivotally moved between a first position in which said first aperture aligns with the second extruding aperture, and a second position to cut-off the flow of dough through said aperture.

2. In a device according to claim 1 in which the first extrusion aperture is of a size and shape to control the extrusion of an exact amount of dough.

3. In a device according to claim 1 in which said valve is provided with a spreader rod slightly above said second aperture to insure an even flow of dough through the extrusion apertures.

References Cited in the file of this patent

UNITED STATES PATENTS

| | | |
|---|---|---|
| 902,088 | Kintner | Oct. 27, 1908 |
| 1,389,976 | Patten | Sept. 6, 1921 |
| 1,814,930 | Hunter | July 14, 1931 |
| 1,823,409 | Roehl | Sept. 15, 1931 |
| 1,855,922 | Mosher | Apr. 26, 1932 |
| 2,463,112 | Kipnis | Mar. 1, 1949 |
| 2,926,597 | Porambo | Mar. 1, 1960 |

FOREIGN PATENTS

| | | |
|---|---|---|
| 154,125 | Great Britain | Nov. 25, 1920 |